(12) United States Patent
Gregg et al.

(10) Patent No.: US 6,961,876 B2
(45) Date of Patent: Nov. 1, 2005

(54) AUTOMATIC HANDLING OF LINK FAILURES

(75) Inventors: Thomas A. Gregg, Highland, NY (US); Stephen R. Burrow, Austin, TX (US); Kulwant M. Pandey, Lagrangeville, NY (US); Patrick J. Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 09/961,014

(22) Filed: Sep. 21, 2001

(65) Prior Publication Data

US 2003/0061377 A1     Mar. 27, 2003

(51) Int. Cl.[7] .............................................. G06F 11/00
(52) U.S. Cl. ........................................ 714/43; 398/20
(58) Field of Search ............................ 714/43; 398/20

(56) References Cited

U.S. PATENT DOCUMENTS

| | | | | |
|---|---|---|---|---|
| 5,757,526 A | * | 5/1998 | Shiragaki et al. | 398/20 |
| 5,905,585 A | * | 5/1999 | Shirai | 398/20 |
| 5,914,794 A | * | 6/1999 | Fee et al. | 398/20 |
| 6,005,694 A | * | 12/1999 | Liu | 398/6 |
| 6,684,347 B1 | * | 1/2004 | Coffey | 714/43 |
| 6,772,373 B2 | * | 8/2004 | Sugeno | 714/43 |
| 6,802,030 B2 | * | 10/2004 | Nakano et al. | 714/43 |

* cited by examiner

Primary Examiner—Robert Beausoliel
Assistant Examiner—Michael Maskulinski
(74) Attorney, Agent, or Firm—Lynn L. Augspurger

(57) ABSTRACT

A method and system for I/O adapters that must rely on a central processor to handle all inbound link events to reduce the number of events signaled to the central processor with hardware state machines that sort out the significant link events and automatically generate the appropriate response on the outbound link thereby greatly reducing the central processor utilization. As optical links fail (unplugging the link is a failure) or when receiving multiple continuous sequences, numerous events must be filtered by the hardware state machines to limit the number of interrupts presented to the central processor.

2 Claims, 4 Drawing Sheets

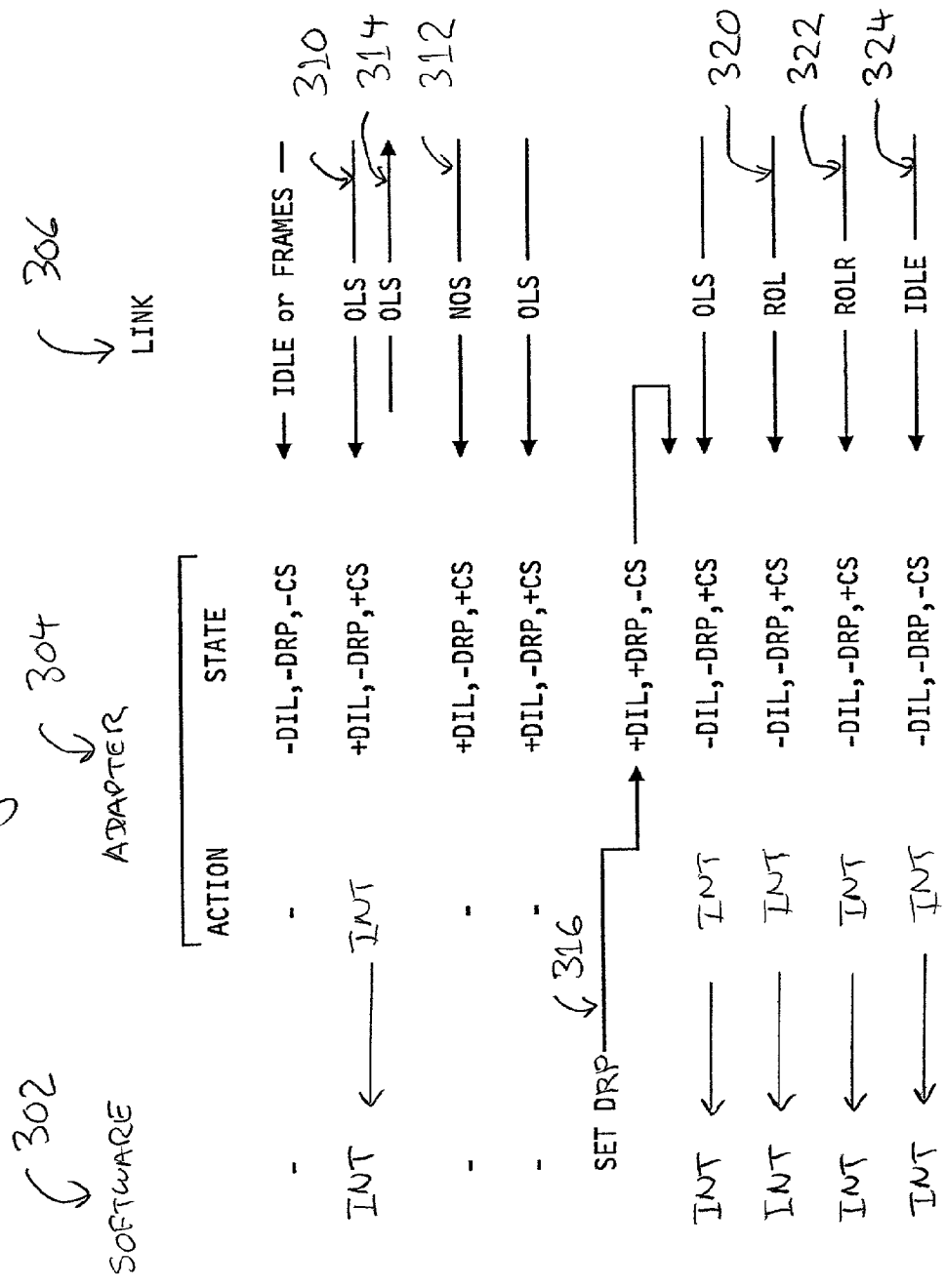

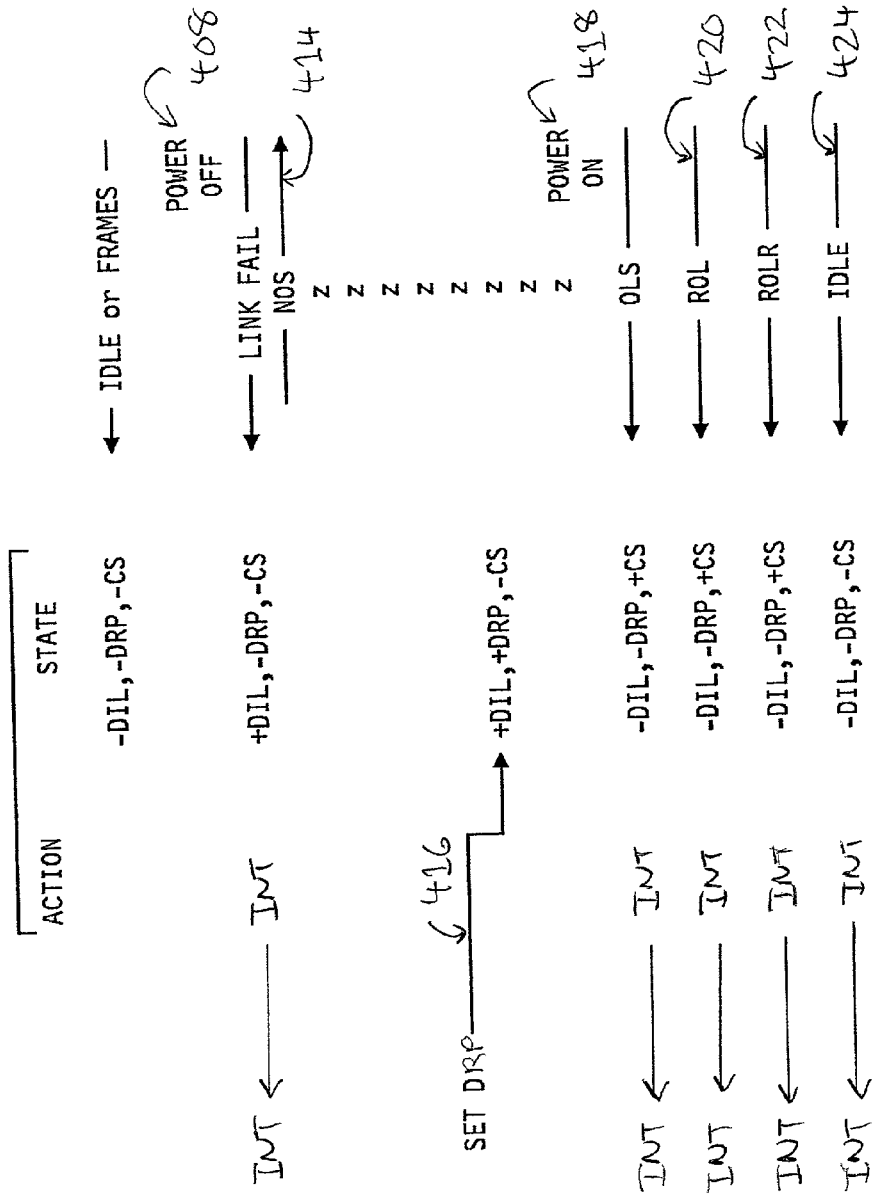

AUTOMATIC HANDLING OF LINK FAILURES

FIELD OF THE INVENTION

The present invention relates generally to communications between computer systems and, more particularly, the present invention is directed to supporting a method and apparatus to send messages between computer systems.

BACKGROUND

Serial optical communication links experience many different kinds of errors and failure behaviors. At one extreme are the occasional single bit errors. These errors cause a single bit in the bit stream to be flipped or complemented and are caused by random noise. When these errors happen during an idle sequence, no recovery action is required. When they happen within an information frame, various recovery actions are taken depending on what part of the frame is corrupted. At the other extreme are link failures that lead to a total loss of communication. These can be caused by anything from a critical component failure, to losing power at one end of the link, to a physical disconnection of the optical fiber transmission medium. Very often, especially when an optical connector somewhere in the operating link is physically disconnected, the link failure condition is preceded by an increasing bit error rate. In some cases a link failure condition is detected followed by a reestablishment of the link followed by a link failure condition multiple times as the optical connector is being slowly disconnected.

Serial optical communication links are usually driven by adapters that have a dedicated processor. In these implementations, the processor is interrupted as each link error and failure event is recognized by the inbound decoder state machines. Even when the link error rates are very high, as when an optical connector is being disconnected, the dedicated processor can keep up with the error events since it has nothing else to do during these high error rate periods.

SUMMARY OF THE INVENTION

The present invention is related to communications between computer systems over serial optical communication links where no expensive dedicated processor is provided. Instead, the communications are controlled by hardware state machines and only interrupt a central processor when specific error conditions are detected.

The preferred embodiment of the invention provides a group of hardware state machines in the adapter that minimize the interruptions to a central processor as link failures are detected. Interruptions to the central processor require a lengthy context switch to hypervisor software and greatly reduce the time the central processor spends doing more useful work. In accordance with the preferred embodiment of this invention the communication sequence responds on the outbound link with a special continuous sequence signaling the failure. Thus, for communicating between computer systems over serial links inbound link events for an inbound link are automically filtered by detecting link failures or the receipt of a continuous sequence other than the idle sequence; and, subsequently disabling the inbound link by ignoring all events until reenabled by an external means. The detection of said link failure or continuous sequence event is reported to a central processor with information describing the nature of the report. This invention handles the receipt of special continuous sequences on the inbound link with the proper special continuous sequence response on the outbound link. In both cases, the adapter is inhibited from causing subsequent interruptions to the central processor before the central processor performs the appropriate recovery actions to the adapter.

It is also an object of this invention that while the link is in a failure mode, the central processor can arm the adapter hardware to interrupt the central processor when a specific set of conditions is detected on the inbound link.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 illustrates an example of a continuous sequence being received on the inbound link; and FIG. 4 illustrates an example of a link failure detected on the inbound link.

DETAILED DESCRIPTION OF THE PREFERRED EMBODIMENT

Figure 1:
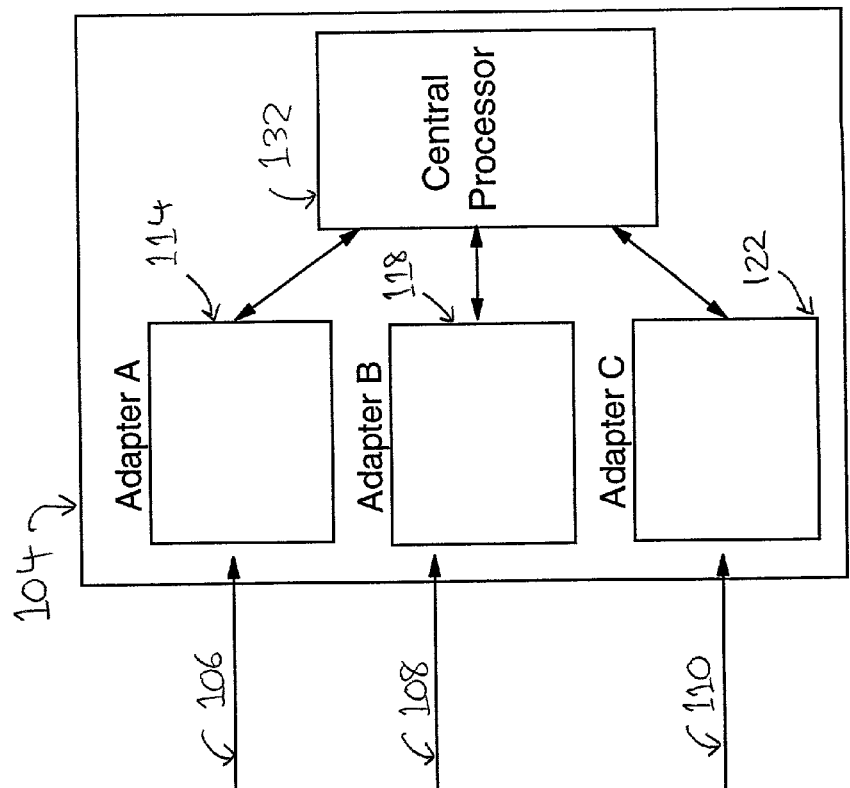
FIG. 1 illustrates two systems interconnected by three links, each link having an adapter at each end and each system having a central processor.
Figure 1:
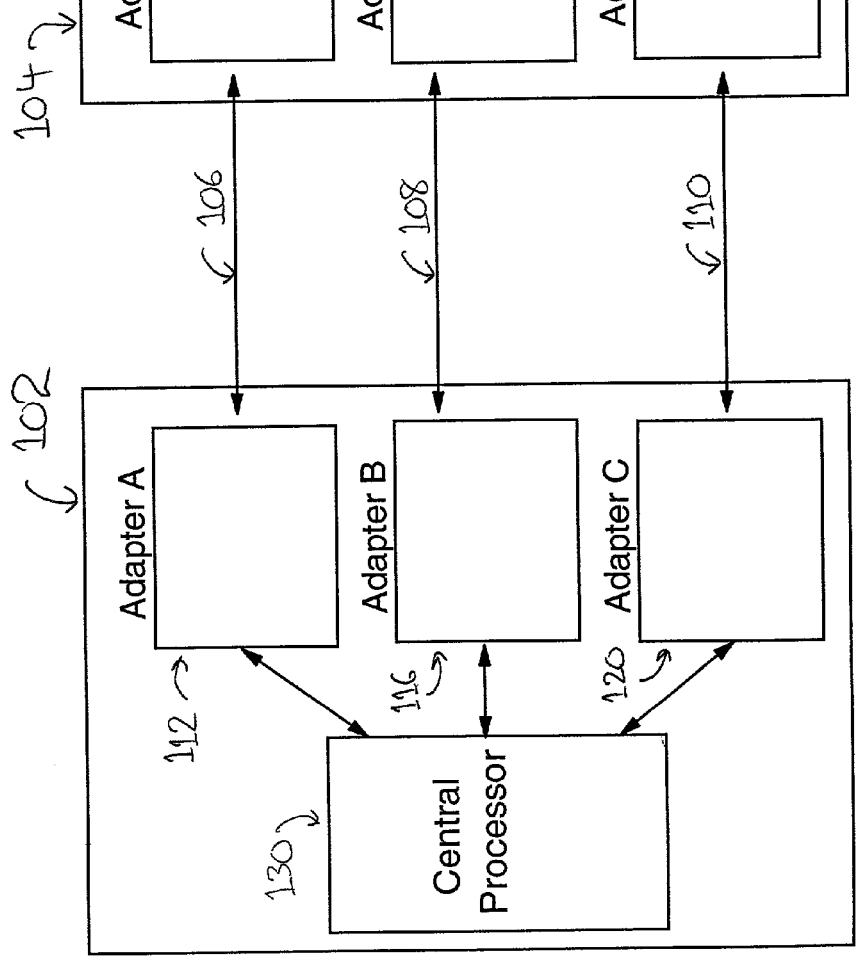

FIG. 1 shows System 1 102 and System 2 104 interconnected by link A 106, link B 108, and link C 110. Link A 106 connects adapter A 112 in System 1 to adapter A 114 in System 2, link B 108 connects adapter B 116 in System 1 to adapter B 118 in System 2, and link C 110 connects adapter C 120 in System 1 to adapter C 122 in System 2. System 1 102 and System 2 104 each contain a central processor 130, 132 that in addition to computation handles all of the exceptions generated by adapters A 112, 114, adapters B 116, 118, and adapters C 120, 122.

The information transmitted over links 106, 108, 110 is encoded using the code described in U.S. Pat. No. 4,486,739, issued Dec. 4, 1984 to Franaszek et al for "Byte Oriented DC Balanced (0,4) 8B/10B Partitioned Block Transmission Code" and assigned to the assignee of the present invention. This invention discloses a binary code and an encoder circuit which transmits an 8 bit byte of information into 10 binary digits for transmission over electromagnetic or optical transmission lines. Outside of encoding the 256 possible 8 bit byte values, the code provides at least one special character, called a K character, used to achieve character synchronism and to signal special conditions. In the normal mode of operation in the absence of error or failures, ordered sets of the K character and data characters are continuously transmitted when no frames are transmitted. This sequence is called a continuous sequence. One of the multiple continuous sequences defined is the idle sequence. Only the idle sequence can be interrupted to send an information frame.

Other continuous sequences signal various link states as described in the definitions below. Bit errors on the link flip one or more of the encoded bits and cause the decoder to detect an invalid code point called a code violation. If the adapter detects code violations at a high enough rate, it enters the loss of sync state. The rate is determined by calculating the ratio of code violations to good characters. If in the loss of sync state, enough good characters are detected without detecting any intervening code violations, the adapter returns to the sync acquired state. If the optical receiver detects no signal (or light) from the link, it sets the loss of signal state. The adapter starts a timer when either the loss of sync or loss of signal states exist. If this timer reaches a value of 100 milliseconds while one or both the loss of sync and loss of signal states exists, the adapter enters the link failure state. This 100 millisecond duration is considered as less than the minimum time required for the physical connection to be manually changed. After a link failure, the connection must be reestablished to verify who is now connected to the other end of the link. At this point, only the central processor can reenable the link.

In summary, the link definitions are:
1) Bit Error. Detected as a code violation in the 8B/10B code.
2) Loss of Sync. Ratio of characters with code violations to characters with good code has been exceeded.
3) Loss of Signal. The optical received has detected no signal form the other end of the link.
4) Link Failure. A Loss of Sync and/or Loss of Signal condition has existed for 100 milliseconds.
5) Continuous Sequences. Continuously transmitted sets of 8B/10B characters used to indicate several different link states:
a) Idle (only sequence in which frames may be transmitted)
b) Not Operational Sequence (NOS)
c) Off-line Sequence (OLS)
d) Return from Off-line Request (ROL)
e) Return form Off-line Response (ROLR)

In addition to defining link errors and failure conditions, the protocol also defines which special continuous sequence is transmitted and defines the handshake of continuous sequences to either take the link off-line, indicate a detected link failure, or put the link back online. In general, these continuous sequences are completely interlocked in that once an adapter starts transmitting a particular continuous sequence, it continues to transmit that continuous sequence until it sees a change in the received continuous sequence. With such an arrangement, both ends of the link step through the continuous sequences until eventually both ends of the link are transmitting the idle sequence. With only one exception, all of the handshaking of the continuous sequences is performed by the central processors.

The exception to the continuous sequence handshaking performed by the central processors is the adapters' automatic response to any non idle continuous sequence. In this situation the adapter responds with the Off-line sequence (OLS). The adapter also responds with the Not Operational sequence (NOS) when the link failure state is entered.

Figure 2:
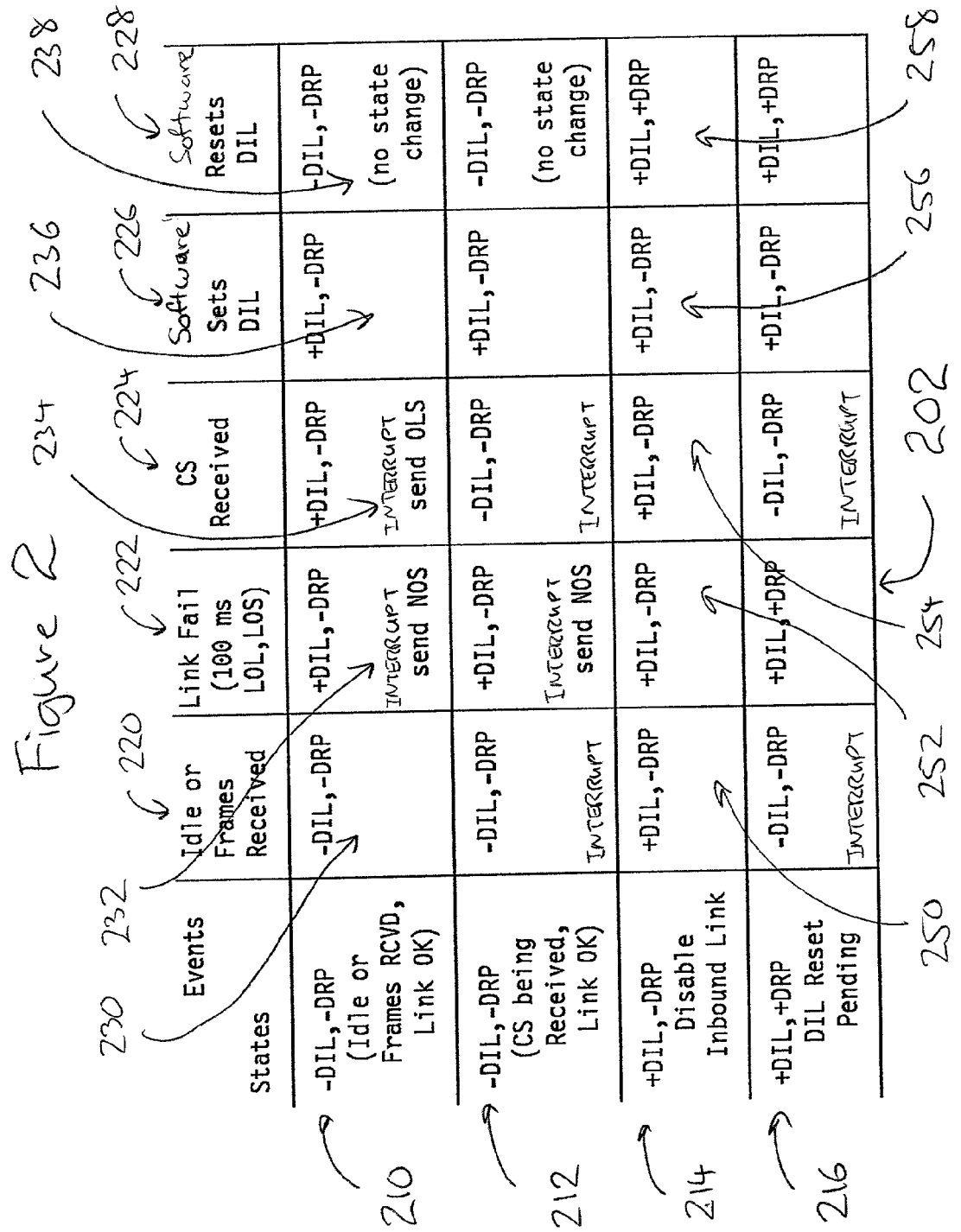
FIG. 2 illustrates the state table controlling how events on the inbound link are presented to the central processor.

FIG. 2 shows how the adapter operates. The state diagram 202 has four states defined by two latches and type of continuous sequence being received. One latch is called Disable Inbound Link (DIL) and a second latch is DIL Reset Pending (DRP). DIL is usually set by the adapter and essentially keeps it from recognizing any activity on the inbound link, and DRP is set by the central processor when it wants to arm the adapter to recognize certain specific conditions on the inbound link. State 210 is the normal operational state where both DIL and DRP are reset and the inbound link is recognizing either the idle continuous sequence or an information frame. State 212 is the detection of a continuous sequence (CS) other than the idle sequence when both DIL and DRP are in the reset state. State 214 is entered when either the adapter detects a continuous sequence (CS) other than the idle sequence or enters the link failure state. In this state DIL is set and DRP is reset. The last state 216 occurs when the central processor wants to arm the adapter to look for specific conditions on the inbound link. In this state both DIL and DRP are set.

FIG. 2 also shows the significant events or conditions detected on the inbound link by the adapter. Event 220 is the normal reception of either the idle continuous sequence or an information frame, event 222 is when the adapter enters the link failure state, event 224 is the recognition of a continuous sequence other than the idle sequence, event 226 is when the central processor software sets the DIL bit and is used when the central processor wants to disable the link as part of taking the line off-line, and event 228 is when the central processor software wants to reenable the adapter to look for specific conditions on the inbound link.

Each of the twenty state changes shown in FIG. 2 defines the next values for the DIL and DRP latches and any actions to be taken by the adapter. For example, in box 230, the adapter is in the normal state 210 and it is receiving either the idle continuous sequence or an information frame. In box 230 no change is made to either DIL or DRP, and no actions are taken. In a properly running system, the adapter stays in box 230 all of the time. The power of this invention starts to be demonstrated in box 232 when the adapter is in the normal operational state and event 222, the link failure state, occurs. The adapter sets DIL and enters state 214. Additionally, the adapter interrupts the central processor and responds to the link failure state by transmitting the not operational sequence (NOS) on the outbound link. In box 234 the adapter is in the normal operational state and event 224, the recognition of a continuous sequence (CS) other than the idle sequence, occurs. As in box 232, the adapter sets DIL, enters state 214, and interrupts the central processor. But in this case, the adapter responds on the outbound link by sending the off-line sequence (OLS). In the prior art, the adapter automatically sends only the off-line sequence (OLS) when either the link failure state is entered or a continuous sequence (CS) other than the idle sequence is recognized. As shown in boxes 250, 252, 254, 256, 258, the adapter is effectively ignoring the inbound link. No matter what events occur, the adapter makes no changes to the state of either DIL or DRP, does not alter the continuous sequence (CS) it is transmitting on the outbound link, and sends no more interrupts to the central processor.

FIG. 2 is further defined by the following notes:
1) All transitions to +DIL (except when set by software) cause a FIFO entry.
2) Link Fail state (Loss of Sync (LOL) and Loss of Signal (LOL)) prevents DIL from being reset.
3) Transitions from one CS other than Idle to a different CS other than Idle do not set DIL if DIL is off and do not interrupt the central processor if DIL on.
4) Transitions to +DIL due to a Link Failure cause NOS to be sent if no other CS other than Idle is being sent.
5) Transitions to +DIL due to a CS other than Idle being received cause OLS to be sent if no other CS other than Idle is being sent.
6) Transitions to +DIL due to software cause no action on the outbound link.

FIG. 3 is an example of how the adapter and software running on the central processor operate when a continuous sequence is received, and FIG. 4 is an example of how the adapter and software running on the central processor operate when a link failure condition is recognized. The software columns 302, 402 show when the central processor receives and interrupt signal from the adapter (INT) and when the central processor sends a set DRP signal to the adapter (resetting its DIL latch). The adapter columns 304, 404 show when the adapter sends an interrupt signal to the central processor, and show current state. The +CS designation indicates that a continuous sequence other than the idle sequence is being recognized, and the +I designation indicates that the idle sequence is being recognized. The link columns 306, 406 show the events on the link, and the arrows show the direction of the events. The arrows pointing to the left are inbound events, and the arrow pointing the right is the automatic continuous sequence response sent on the link.

Referring to FIG. 3 and assuming that either the idle sequence or an information frame is being received immediately before the continuous sequence, the receipt of a continuous sequence 310 (off-line sequence in this example) sets the DIL bit and continuous sequence (CS) bit in the adapter and signals the central processor with information describing the event such as the type of continuous sequence recognized. With the DIL bit on, no new entries are made even if a new continuous sequence 312 (not operational sequence in this example) is received or the link fails. The receipt of a continuous sequence also causes the adapter to respond on the outbound link with off-line sequence 314.

Eventually, the central processor handles the interrupt. It examines the event information, and if the software wants to try to reestablish the link, it sets the DRP latch in the adapter 316. The DIL bit stays in the set state. In this example, the link is active, and either a continuous sequence or idle sequence is being received. The adapter recognizes the continuous sequence, and signals the central processor, and resets both the DIL and DRP bits. As new continuous sequences, return from off-line (ROL) 320, return form off-line response (ROLR) 322, and idle sequence (IDLE) 324 are recognized, the adapter signals the central processor.

Referring to FIG. 4, and assuming that either the idle sequence or an information frame is being received immediately before the link failure condition is recognized, the adapter sets the DIL bit and signals the central processor. In this example an unexpected powering down 408 of the other end of the link causes the link failure condition. With the DIL bit on, no signals are sent to the central processor even if the other end of the link powers up and starts sending a continuous sequence. The detection of the link failure also causes the adapter to respond on the outbound link with not operational sequence 414.

Eventually, the central processor handles the interrupt. It examines the event information, and if the software wants to try to reestablish the link, it sets the DRP latch in the adapter 416. In this example, the other end of the link powers up 418 and starts sending the off-line sequence after the software sets the DRP bit in the adapter. Once this continuous sequence is recognized by the adapter, it signals the central processor and resets both the DIL and DRP bits. As new continuous sequences, return from off-line (ROL) 420, return form off-line response (ROLR) 422, and idle sequence (IDLE) 424 are recognized, the adapter signals the central processor.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for communicating between computer systems over serial links comprising the steps of:
   automatically filtering inbound link events for an inbound link by
   detecting link failures or the receipt of a continuous sequence other than the idle sequence on said inbound link; and
   subsequently disabling the inbound link by ignoring all events until reenabled by an external means, and wherein an adapter reports to the central processor changes from one continuous sequence other than idle to another continuous sequence other than idle.

2. The method as recited in claim 1, wherein the adapter having previously detected a link failure or the first continuous sequence other than idle following the receipt of the idle sequence inhibits reporting subsequent continuous sequence changes.

* * * * *